US011984086B2

(12) United States Patent
An et al.

(10) Patent No.: US 11,984,086 B2
(45) Date of Patent: May 14, 2024

(54) DISPLAY DEVICE AND TEMPERATURE SENSING METHOD THEREOF

(71) Applicant: Samsung Display Co., Ltd., Yongin-Si (KR)

(72) Inventors: Tae Hyeong An, Yongin-si (KR); Jae Hoon Lee, Yongin-si (KR); Byung Ki Chun, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 18/124,609

(22) Filed: Mar. 22, 2023

(65) Prior Publication Data

US 2023/0410755 A1 Dec. 21, 2023

(30) Foreign Application Priority Data

Jun. 20, 2022 (KR) ........................ 10-2022-0075160

(51) Int. Cl.
*G09G 3/3291* (2016.01)
*G09G 3/32* (2016.01)

(52) U.S. Cl.
CPC ............. *G09G 3/3291* (2013.01); *G09G 3/32* (2013.01); *G09G 2320/0257* (2013.01); *G09G 2320/041* (2013.01)

(58) Field of Classification Search
CPC ............................... G09G 3/3291; G09G 3/32
See application file for complete search history.

(56) References Cited

U.S. PATENT DOCUMENTS 8,907,991 B2 * 12/2014 Jaffari ..................... G06F 30/23 345/204
10,127,857 B2 11/2018 Lee et al.
11,854,478 B2 * 12/2023 Moriya ................ G09G 3/3233

* cited by examiner

*Primary Examiner* — Sardis F Azongha
(74) *Attorney, Agent, or Firm* — Innovation Counsel LLP

(57) ABSTRACT

Provided is a display device comprising at least one sensing pixel including a sensing pixel circuit, a sensing unit including sensing circuit, and a temperature output unit to calculate a temperature of the display panel based on the sensing data. The sensing data is generated from a sensing pixel including a driving transistor in which a current generated according to temperature varies, and a temperature is measured from the sensing data.

20 Claims, 10 Drawing Sheets

SL: SL1, SL2, SL3
DRS: GW, GB, GI, EM, Vdata

CL: CL1, CL2, CL3, CL4

SS: SS1: CS1, CS2, CS3, CS4, Sdata; SS2: CS1, CS3, CS4, Sdata

DISPLAY DEVICE AND TEMPERATURE SENSING METHOD THEREOF

CROSS-REFERENCE TO RELATED APPLICATION

The present application claims priority under 35 U.S.C. § 119(a) to Korean patent application No. 10-2022-0075160 filed on Jun. 20, 2022 in the Korean Intellectual Property Office; the Korean patent application is incorporated herein by reference.

BACKGROUND

1. Technical Field

The present disclosure relates to a display device. More particularly, the present disclosure relates to a display device and a temperature sensing method of the display device.

2. Related Art

Recently, interest in information displays has been increased. Accordingly, research and development of display devices have been continuously conducted.

In a display device, a degradation state of a pixel is differently set by a temperature change, particularly, a temperature change in the display device, and hence attempts for measuring a temperature in the display device have been continuously made. However, since most current display devices measure a temperature by using an external temperature sensor, an error occurs in temperature prediction in a display device, or it is difficult to accurately measure a temperature in the display device.

SUMMARY

Embodiments may be related a display device and a temperature sensing method of the display device, which can more accurately measure a temperature in the display device.

In accordance with embodiments, a display device may include the following elements: at least one sensing pixel including a sensing pixel circuit having a driving transistor in which a current generated according to temperature varies and a non-light emitting diode connected to the sensing pixel circuit, the at least one sensing pixel being provided in a display panel; a sensing unit including a current sensing circuit having a sensing line which is connected to the sensing pixel circuit and has a current of the sensing pixel flowing therein, the sensing unit sensing a current generated in the driving transistor to flow in the sensing line by a predetermined repetition number of times, the sensing unit generating sensing data corresponding to the sensed current; and a temperature output unit to calculate a temperature of the display panel based on the sensing data, wherein, in a first sensing mode, a first sensing signal is applied to the sensing pixel, and wherein the first sensing signal includes a sensing data voltage, a first control signal, a second control signal, a third control signal, and a fourth control signal.

The sensing data voltage may be a voltage corresponding to data of a pre-secured temperature-current relationship of the driving transistor.

The sensing pixel circuit may further include: a first switching transistor connected between a first node connected to a gate electrode of the driving transistor and a data line to which a data voltage is applied, the first switching transistor being turned on in response to the first control signal; a second switching transistor connected between a reference power line to which a reference power voltage is applied and the first node, the second switching transistor being turned on in response to the second control signal; a first capacitor connected between the first node and a second node which is disposed between the driving transistor and the non-light emitting diode; a third switching transistor connected between an initialization power line to which an initialization power voltage is applied and the second node, the third switching transistor being turned on in response to the third control signal; a fourth switching transistor connected between a first power line to which a first power voltage is applied and the driving transistor, the fourth switching transistor being turned off in response to the fourth control signal; and a second capacitor connected between the first power line and the second node.

The current sensing circuit may further include: an amplifier to sense the current; a switch connected to the amplifier to initialize the sensing line; and an Analog-to-Digital Converter (ADC) to generate sensing data in a digital form, which corresponds to the current.

The sensing unit may initialize the sensing line before sensing, and repetitively perform sensing by initializing the sensing line, when the sensing is performed less than the predetermined repetition number of times.

The display device may further include a filter unit configured to filter the generated sensing data.

The temperature output unit may include: a Signal to Noise Ratio (SNR) calculation unit configured to calculate an SNR of the sensing data and compare the calculated SNR with a predetermined value; and a temperature calculation unit configured to calculate a temperature corresponding to the sensing data from the data of the pre-secured temperature-current relationship, when the calculated SNR is equal to or greater than the predetermined value.

When the calculated SNR is less than the predetermined value, the SNR calculation unit may reset the predetermined repetition number of times. The sensing unit may again perform sensing by the reset repetition number of times.

In a second sensing mode, a second sensing signal may be applied to the sensing pixel. The second sensing signal may include a sensing data voltage, a first control signal, a third control signal, and a fourth control signal.

At least two sensing pixels may be provided in the display panel. In a third sensing mode, a first sensing signal may be applied to one sensing pixel selected from the sensing pixels, and a third sensing signal may be applied to another sensing pixel. The third sensing signal may include a black data voltage, a first control signal, a second control signal, a third control signal, and a fourth control signal.

Embodiments may be related to a temperature sensing method of a display device. The temperature sensing method may include the following phrases/steps: applying sensing signals to at least one sensing pixel including a sensing pixel circuit having a driving transistor in which a current generated according to temperature varies and a non-light emitting diode connected to the sensing pixel circuit, the at least one sensing pixel being provided in a display panel; initializing a sensing line connected to the sensing pixel; sensing a current generated in the driving transistor to flow in the sensing line by a predetermined repetition number of times; generating sensing data corresponding to the sensed current; and calculating a temperature of the display panel based on the sensing data.

The sensing signals may include first sensing signals or second sensing signals. The first sensing signals may include a sensing data voltage, a first control signal, a second control signal, a third control signal, and a fourth control signal. The second sensing signals may include a sensing data voltage, a first control signal, a third control signal, and a fourth control signal.

The sensing data voltage may be a voltage corresponding to data of a pre-secured temperature-current relationship of the driving transistor.

The sensing pixel may further include: a first switching transistor connected between a first node connected to a gate electrode of the driving transistor and a data line to which a data voltage is applied, the first switching transistor being turned on in response to the first control signal; a second switching transistor connected between a reference power line to which a reference power voltage is applied and the first node, the second switching transistor being turned on in response to the second control signal; a first capacitor connected between the first node and a second node between the driving transistor and the non-light emitting diode; a third switching transistor connected between an initialization power line to which an initialization power voltage is applied and the second node, the third switching transistor being turned on in response to the third control signal; a fourth switching transistor connected between a first power line to which a first power voltage is applied and the driving transistor, the fourth switching transistor being turned off in response to the fourth control signal; and a second capacitor connected between the first power line and the second node.

When the sensing is performed less than the predetermined repetition number of times, the sensing line may be initialized, thereby repetitively performs performing sensing.

The temperature sensing method may further include a step of filtering the generated sensing data, after the generating sensing data corresponding to the sensed current.

The calculating of the temperature may be performed when an SNR of the sensing data is equal to or greater than a predetermined value.

When the SNR of the sensing data is less than the predetermined value, the predetermined repetition number of times may be reset, and the temperature sensing method may be restarted from the initializing.

In the calculating of the temperature, a temperature corresponding to the sensing data may be calculated from the data of the pre-secured temperature-current relationship.

At least two sensing pixels may be provided in the display panel. First sensing signals may be applied to one sensing pixel selected from the sensing pixels, and third sensing signals may be applied to another sensing pixel. The first sensing signals may include a sensing data voltage, a first control signal, a second control signal, a third control signal, and a fourth control signal. The third sensing signals may include a black data voltage, a first control signal, a second control signal, a third control signal, and a fourth control signal.

DETAILED DESCRIPTION

Figure 1:
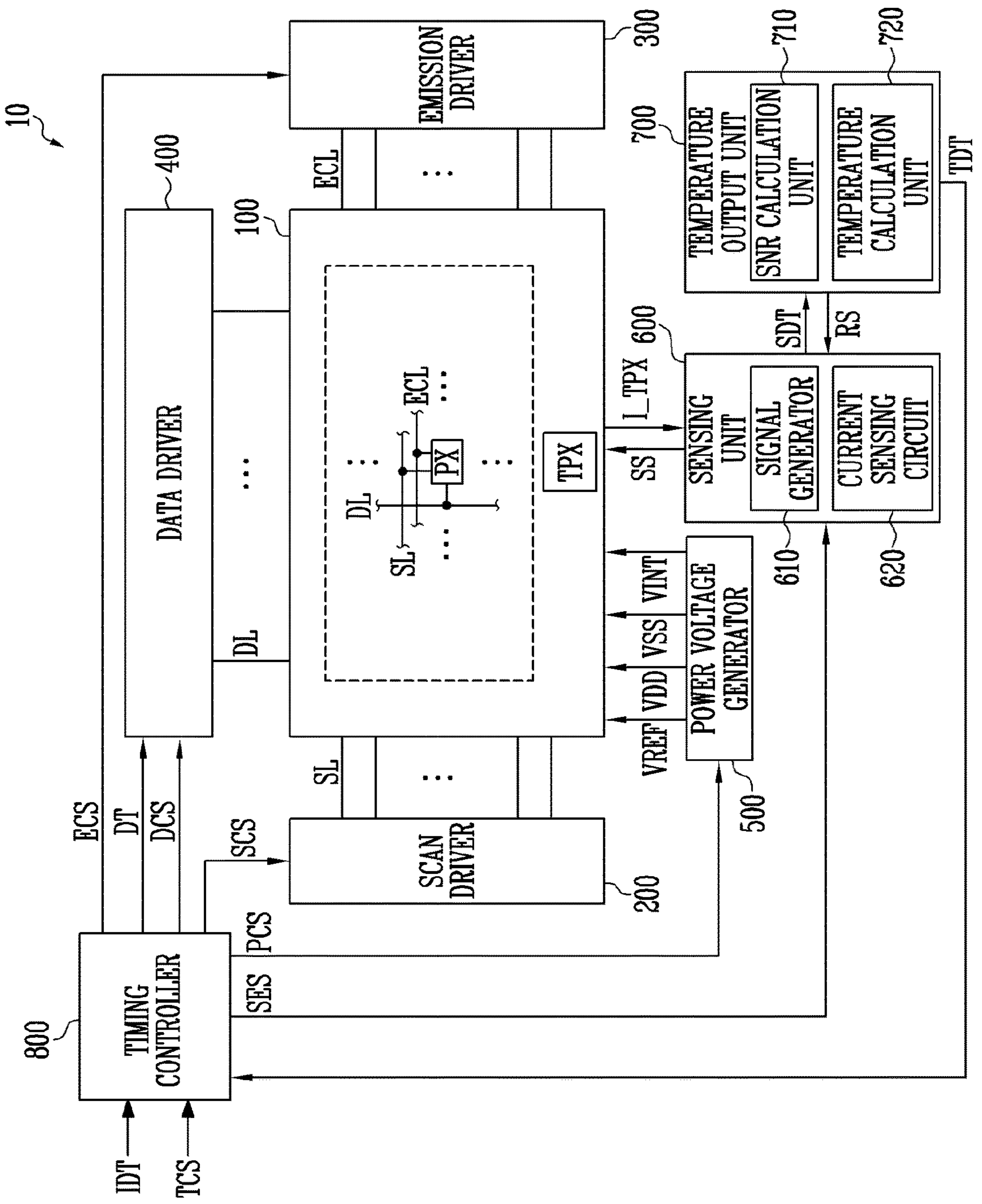
FIG. 1 is a block diagram illustrating a display device in accordance with embodiments.

Examples of embodiments are described with reference to the drawings. Various changes may be applicable to the examples. The examples do not limit the scope of the disclosure.

Like numbers may refer to like elements in the description and the drawings. In the drawings, dimensions may be exaggerated for clarity.

Although the terms "first," "second," etc. may be used to describe various elements, these elements should not be limited by these terms. These terms may be used to distinguish one element from another element. Thus, a "first" element discussed below could also be termed a "second" element without departing from the teachings of the present disclosure. The description of an element as a "first" element may not require or imply the presence of a second element or other elements. The terms "first," "second," etc. may be used to differentiate different categories or sets of elements. For conciseness, the terms "first," "second," etc. may represent "first-category (or first-set)," "second-category (or second-set)," etc., respectively.

The singular forms may represent the plural forms as well, unless the context clearly indicates otherwise.

The terms "comprise(s)," "comprising," "include(s)" and/or "including" may specify the presence of stated features, but may not preclude the presence and/or addition of one or more other features.

FIG. 1 is a block diagram illustrating a display device in accordance with embodiments.

Referring to FIG. 1, the display device 10 may include a display panel 100, a scan driver 200, an emission driver 300, a data driver 400, a power voltage generator 500, a sensing unit 600, a temperature output unit 700, and a timing controller 800.

In a display mode, the display device 10 may display an image at various driving frequencies according to driving conditions. The driving frequency is a frequency at which a data signal is substantially written to a driving transistor of each pixel PX. The driving frequency is also referred to as an image refresh rate, a screen refresh rate, a screen scan rate or a screen refresh frequency, and represents a frequency at which a display screen is reproduced for one second. The display device 10 may display images corresponding to various driving frequencies in a range of 1 Hz to 120 Hz.

In a sensing mode, the display device 10 may sense a current generated in a driving transistor of at least one sensing pixel TPX by supplying sensing signals to the at least one sensing pixel TPX, and calculate a temperature of the display panel 100 based on the sensed current. In embodiments, the sensing mode may include a first sensing mode in which the display device 10 operates according to first sensing signals SS1, a second sensing mode in which the display device 10 operates according to second sensing signals SS2, and a third sensing mode in which the display device 10 operates according to the first sensing signals SS1 and third sensing signals SS3. Each sensing signal and an operation of the sensing mode will be described below.

The display panel 100 may display an image. The display panel 100 may include pixels PX for displaying a predetermined image and sensing pixels TPX for calculating a temperature of the display panel 100.

The pixels PX may be electrically connected to scan lines SL, emission control lines ECL, and data lines DL, respectively. For example, each pixel PX may be electrically connected to a scan line and an emission control line ECL, which are disposed on a corresponding horizontal line, and a data line DL disposed on a corresponding vertical line. Although a case where each pixel PX is connected to one scan line SL has been illustrated in FIG. 1, the embodiments of the present disclosure are not limited thereto. For example, two or more scan lines SL to which different scan signals are applied may be disposed on each horizontal line, and each pixel PX may be electrically connected to the two or more scan lines SL.

In the display mode, driving signals DRS (shown in FIG. 2) may be provided to each of the pixels PX. Each of the pixels PX may be supplied with driving signals, and emit light with a luminance corresponding to the driving signals. In an embodiment, the driving signals may include scan signals respectively supplied to the pixels PX through scan lines SL, emission control signals respectively supplied to the pixels PX through emission control lines ECL, and data signals respectively supplied to the pixels PX through data lines DL.

The pixels PX may be supplied driving voltages from the power voltage generator 500. In an embodiment, the driving voltages may include a first power voltage VDD (e.g., a high-potential pixel voltage) and a second power voltage VSS (e.g., a low-potential pixel voltage), and further include at least one of a reference power voltage VREF and an initialization power voltage VINT.

Signal lines and power lines, which are connected to the pixels PX, and driving signals and driving voltages, which are supplied from the signal lines and the power lines, are not limited to the above-described embodiment. Signal lines and power lines, which are connected to the pixels PX, and driving signals and/or driving voltages, which are supplied from the signal lines and the power lines, corresponding to a circuit structure and/or a driving method of the pixels PX may be variously changed.

At least one sensing pixel TPX may be provided in the display panel 100. The sensing pixel TPX is used to calculate a temperature of the display panel 100, and a forming position of the sensing pixel TPX may be experimentally determined.

The sensing pixel TPX may be supplied with sensing signals SS and driving voltages. In an embodiment, the sensing signals SS may include first sensing signals SS1 (shown in FIGS. 4 and 5) including a sensing data voltage Sdata, a first control signal CS1, a second control signal CS2, a third control signal CS3, and a fourth control signal CS4, second sensing signals SS2 (shown in FIGS. 4 and 5) including a sensing data voltage Sdata, a first control signal CS1, a third control signal CS3, and a fourth control signal CS4, and third sensing signals SS3 (shown in FIG. 8) including a black data voltage Bdata, a first control signal CS1, a second control signal CS2, a third control signal CS3, and a fourth control signal CS4.

Figure 7:
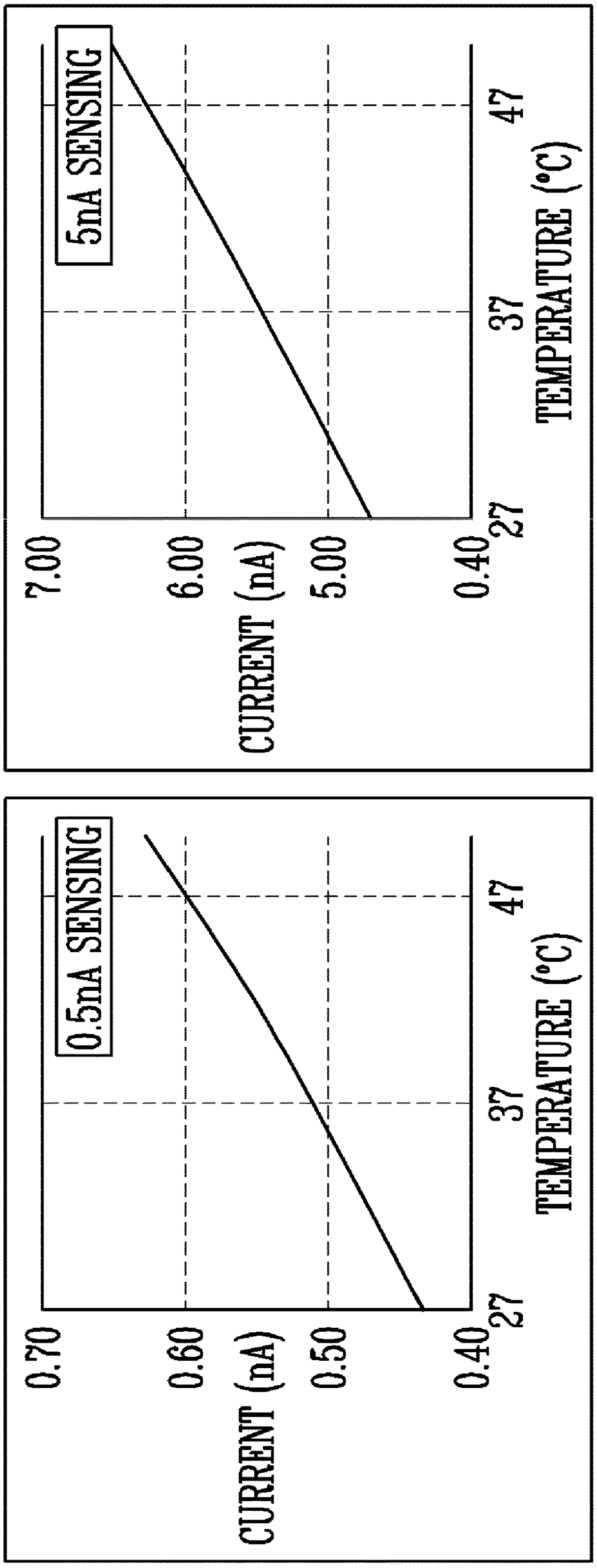
FIG. 7 is a graph illustrating data of a temperature-current relationship of a driving transistor of a sensing pixel in accordance with embodiments.

FIG. 7 is a graph illustrating data of a temperature-current relationship of a driving transistor of a sensing pixel in accordance with embodiments.

Referring to FIG. 7, the sensing data voltage Sdata may be a voltage corresponding to data of a temperature-current relationship of a driving transistor (e.g., a second driving transistor) of the sensing pixel TPX. For example, data representing a temperature-current correlation of the driving transistor of the sensing pixel TPX may be experimentally secured in each of specific data voltages (e.g., a voltage corresponding to 0.5 nA or 5 nA, shown in FIG. 7) before sensing, and any one of the specific data voltages may be the sensing data voltage Sdata. Pre-secured data of the temperature-current relationship may be extracted in various graph forms such as a straight line and a curved line according to characteristics of the driving transistor of the sensing pixel TPX. The black data voltage Bdata is a voltage corresponding to a black grayscale, and may be applied to the sensing pixel TPX to which the sensing data voltage Sdata is applied and another sensing pixel TPX in the third sensing mode (or differential sensing mode).

The sensing signals SS may be signals of which kind and/or waveform are/is similar to a kind and/or a waveform of driving signals (e.g., scan signals, emission control signals, and data signals) for respectively driving the pixels PX, but the embodiments of the present disclosure are not limited thereto.

The sensing signals SS may be provided to the sensing pixel TPX in each sensing mode. In an embodiment, the sensing signals SS may be independently supplied from the sensing unit 600, separately from the driving signals DRS. For example, the sensing signals SS may be generated in a signal generator 610 of the sensing unit 600 based on sensing driving signals SES supplied from the timing controller 800, to be supplied to the sensing pixel TPX. Accordingly, the pixels PX and the sensing pixel TPX may be driven independently from each other. In another embodiment, the sensing pixel TPX may be electrically connected to the scan driver 200, the emission driver 300, and/or the data driver 400, to be supplied with the sensing signals SS from the scan driver 200, the emission driver 300, and/or the data driver 400.

Figure 2:
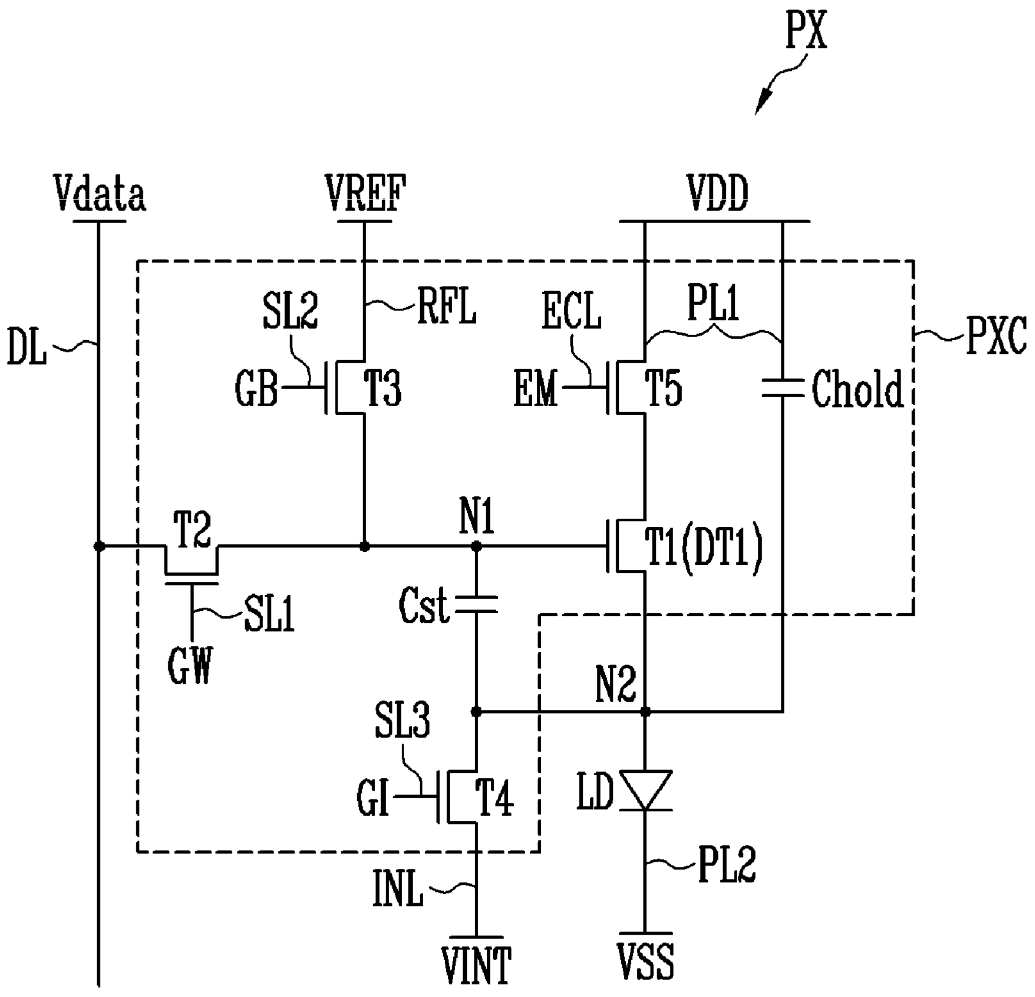
FIG. 2 is a circuit diagram illustrating a pixel included in the display device shown in FIG. 1 in accordance with embodiments.

The sensing pixel TPX may include a pixel circuit (e.g., a pixel circuit (e.g., a sensing pixel circuit TPXC shown in FIG. 4) having a structure substantially identical to a structure of a pixel circuit PXC shown in FIG. 2) included in each of the pixels PX and a non-light emitting diode DI connected to the pixel circuit. That is, the sensing pixel TPX is formed such that a current I_TPX corresponding to the sensing signals SS can flow, and may not include any light emitting element. Accordingly, unnecessary light emission in the sensing pixel TPX can be prevented while sensing is performed. However, the sensing pixel TPX may correspond to a light emitting element of the pixel PX, and include a non-light emitting diode DI so as to prevent leakage of the current I_TPX of the sensing pixel TPX. The non-light emitting diode DI may have a form in which a transistor is diode-connected.

The sensing pixel TPX may be driven at the sensing data voltage Sdata during each sensing period. Accordingly, a current I_TPX corresponding to the sensing data voltage Sdata may flow in the sensing pixel TPX during each sensing period. The current I_TPX may be supplied to the sensing unit 600 connected to the sensing pixel TPX, and accordingly, the sensing unit 600 may sense a current I_TPX flowing in the sensing pixel TPX during each sensing period.

The sensing period may be cyclically, conditionally, and/or regularly executed for every certain cycle and/or whenever a certain condition is satisfied.

The scan driver 200 may receive scan driving signals SCS from the timing controller 800. The scan driving signals SCS may include a sampling signal and/or timing signals, necessary for driving of the scan driver 200. The scan driver 200 may supply scan signals respectively to the scan lines SL based on the scan driving control signals SCS.

Each scan signal may have a gate-on voltage at which a transistor supplied with the scan signal can be turned on. For example, a scan signal having a low level may be supplied to a P-type transistor, and a scan signal having a high level may be supplied to an N-type transistor. Accordingly, a transistor receiving each scan signal may be turned on corresponding to the scan signal.

The emission driver 300 may receive emission driving signals ECS from the timing controller 800. The emission driving signals ECS may include a sampling signal and/or timing signals, necessary for driving of the emission driver 300. The emission driver 300 may supply emission control signals respectively to the emission control lines ECL based on the emission driving signals ECS. For example, the emission driver 300 may sequentially supply the emission control signals to the emission control lines ECL based on the emission driving signals ECS.

Each emission control signal may have a gate-off voltage at which a transistor supplied with the emission control signal can be turned off. For example, an emission control signal having a high level may be supplied to a P-type transistor, and an emission control signal having a low level may be supplied to an N-type transistor. Accordingly, a transistor receiving each emission control signal may be turned off corresponding to the emission control signal to maintain the state in which the transistor is turned off during a period in which the emission control signal is supplied.

Although an embodiment in which the scan driver 200 and the emission driver 300 are provided as components separated from each other has been illustrated in FIG. 1, the embodiments of the present disclosure is not limited thereto. For example, the scan driver 200 and the emission driver 300 may be integrated as one driving circuit, one module, or the like.

The data driver 400 may receive data driving signals DCS and image data DT from the timing controller 800. The data driving signals DCS may include a sampling signal and/or timing signals, necessary for driving of the data driver 400. The data driver 400 may supply data signals respectively to the data lines DL based on the data driving signals DCS and the image data DT. For example, the data driver 400 may generate data signals having analog data voltages corresponding to respective grayscale values included in the image data DT supplied as digital data, and output the data signals to the respective data lines DL. The data signals output to the data lines DL may be supplied to the respective pixels PX.

The power voltage generator 500 may receive power driving signals PCS from the timing controller 800. The power voltage generator 500 may generate driving voltages of the pixels PX and the sensing pixel TPX based on the power driving signals PCS, and supply the driving voltages to the display panel 100 through the respective power lines. In an embodiment, the power voltage generator 500 may be a power management integrated circuit (PMIC) or include the PMIC.

The power voltage generator 500 may generate a first power voltage VDD, a second power voltage VSS, a reference power voltage VREF, and an initialization power voltage VINT, and supply the first power voltage VDD, the second power voltage VSS, the reference power voltage VREF, and the initialization power voltage VINT to the display panel 100 and the sensing unit 600. The first power voltage VDD, the second power voltage VSS, and the reference power voltage VREF may supply the pixels PX and the sensing pixel TPX. The initialization power voltage VINT may be supplied to the pixels PX, the sensing pixel TPX, and the sensing unit 600.

The sensing unit 600 may be electrically connected to the sensing pixel TPX, sense a current I_TPX flowing in the sensing pixel TPX by a predetermined repetition number of times, and generate sensing data SDT corresponding to the sensed current. The predetermined repetition number of times may be differently set according to a temperature range to be sensed and a magnitude of a target current I_TPX. In an embodiment, the sensing unit 600 may generate sensing signals SS necessary for driving of the sensing pixel TPX, corresponding to the sensing driving signals SES from the timing controller 800.

In the first sensing mode, when the first sensing signals SS1 are applied to a sensing pixel TPX, the sensing unit 600 may initialize a sensing line SEL, sense a current generated in a driving transistor included in the sensing pixel TPX to flow in the sensing line SEL by the predetermined repetition number of times, and generate sensing data SDT corresponding to the sensed current.

In the second sensing mode, when the second sensing signals SS2 are applied to a sensing pixel TPX, the sensing unit 600 may initialize a sensing line SEL, sense a current generated in a driving transistor included in the sensing pixel TPX to flow in the sensing line SEL by the predetermined repetition number of times, and generate sensing data SDT corresponding to the sensed current.

In the third sensing mode, when the first sensing signals SS1 are applied to one sensing pixel TPX selected from at least two sensing pixels TPX and the third sensing signals SS3 are applied to another sensing pixel TPX, the sensing unit 600 may initialize each sensing line SEL, sense a current generated in a driving transistor included in each sensing pixel TPX to flow in the sensing line SEL by the predetermined repetition number of times, and generate sensing data SDT corresponding to the sensed current.

When sensing is performed less than the predetermined repetition number of times, the sensing unit 600 may repetitively perform the sensing by initializing the sensing line SEL, and thus the accuracy of the sensing data SDT can be further improved through repetitive sensing. Also, when sensing is performed the predetermine repetition number of times or more, the sensing unit 600 may output the generated sensing data SDT to the temperature output unit 700.

The sensing unit 600 may include the signal generator 610 and a current sensing circuit 620.

The signal generator 610 may receive sensing driving signals SES, and generate sensing signals SS necessary for driving the sensing pixel TPX, corresponding to the sensing driving signals SES. For example, the signal generator 610 may receive sensing driving signals SES in a digital form, generate sensing signals having analog voltages respectively corresponding to the sensing driving signals SES, and supply the sensing signals SS to the sensing pixel TPX. In an embodiment, the signal generator 610 may include a level shifter for converting sensing driving signals SES in a digital form into sensing signals SS in an analog form.

When the sensing signals SS are generated by the scan driver 200, the emission driver 300, and/or data driver 400, the sensing pixel TPX may be electrically connected to the scan driver 200, the emission driver 300, and/or data driver 400, and the signal generator 610 may be omitted. For example, in some embodiments, the sensing unit 600 includes only current sensing circuit 620, and may not include the signal generator 610.

The current sensing circuit 620 may be electrically connected to the sensing pixel TPX, to sense a current I_TPX of the sensing pixel TPX by the predetermined repetition number of times. The current sensing circuit 620 may generate sensing data SDT corresponding to the current I_TPX of the sensing pixel TPX, and output the sensing data SDT to the temperature output unit 700. The current sensing circuit 620 will be described in detail later with reference to a detailed embodiment.

The display device 10 may a filter unit (not shown) for filtering sensing data SDT generated in the sensing unit 600. The filter unit (not shown) may receive sensing data SDT generated in the sensing unit 600 and perform filtering on the sensing data SDT. To this end, the filter unit (not shown) may be provided with a filter such as a median filter or an average filter. However, the filter which may be provided in the filter unit (not shown) is not limited to the above-described filters, and any filter may be provided in the filter unit (not shown) without limitation as long as the filter can improve accuracy by removing noise of the sensing data SDT.

The temperature output unit 700 may calculate temperature data TDT based on the sensing data SDT supplied from the sensing unit 600. In an embodiment, the temperature output unit 700 may include a Signal to Noise Ratio (SNR) calculation unit 710 for securing an SNR of sensing data SDT and a temperature calculation unit 720 for calculating temperature data TDT based on the sensing data SDT. The temperature output unit 700 may supply the calculated temperature data TDT to the timing controller 800, but the present disclosure is not limited thereto. For example, the temperature output unit 700 may transmit the calculated temperature data TDT to a compensator (not shown) configured separately from the timing controller 800 to compensate for an afterimage based on a calculated temperature. The temperature output unit 700 will be described in detail later with reference to a detailed embodiment.

The timing controller 800 may receive input image data IDT and timing control signals TCS from a host system (e.g., an application processor (AP)) through an interface. The timing control signals TCS may include synchronization signals such as a vertical synchronization signal and a horizontal synchronization signal, a data enable signal, a clock signal, and the like.

The timing controller 800 may generate the scan driving signals SCS, the emission driving signals ECS, the data driving signals DCS, the power driving signals PCS, and the sensing driving signals SES based on the timing control signals TCS. The scan driving signals SCS, the emission driving signals ECS, the data driving signals DCS, the power driving signals PCS, and the sensing driving signals SES may be respectively supplied to the scan driver 200, the emission driver 300, the data driver 400, the power voltage generator 500, and the sensing unit 600. Also, the timing controller 800 may output a control signal (e.g., a switch control signal CS_SW shown in FIG. 4 or a digital signal corresponding thereto) for initializing the sensing line SEL for each sensing period.

Additionally, although a case where the timing controller 800, the data driver 400, the sensing unit 600, and the temperature output unit 700 are components separate from one other has been illustrated in FIG. 1, the present disclosure is not limited thereto. In an example, the timing controller 800, the data driver 400, the sensing unit 600, and/or the temperature output unit 700 may be implemented as one driving circuit (or integrated circuit (IC)).

FIG. 2 is a circuit diagram illustrating a pixel included in the display device shown in FIG. 1.

A pixel PX shown in FIG. 2 may be one of the pixels PX included in the display device 10 shown in FIG. 1, and the pixels PX may have structures substantially similar or identical to one another.

Referring to FIGS. 1 and 2, the pixel PX may be connected to signal lines provided on a corresponding horizontal line and a corresponding vertical line. For example, the pixel PX may be connected to at least one scan line SL and an emission control line ECL, which are disposed on the corresponding horizontal line, and a data line DL disposed on the corresponding vertical line. In an embodiment, the pixel PX may be connected to a first scan line SL1, a second scan line SL2, a third scan line SL3, and the emission control line ECL of the corresponding horizontal line, and the data line DL of the corresponding vertical line (when at least two data lines DL corresponding to pixels PX of different colors are disposed on the corresponding vertical line, one of the data lines DL).

The pixel PX may be further connected to power lines. For example, the pixel PX may be connected to a first power line PL1 and a second power line PL2. In an embodiment, the pixel PX may be further connected to a reference power line RFL and an initialization power line INL.

The pixel PX may include a pixel circuit PXC and a light emitting element LD connected to the pixel circuit PXC. The pixel circuit PXC may include a first transistor T1 (also referred to as a “first driving transistor DT1”), a second transistor T2 (also referred to as a “first switching transistor”), and a first capacitor Cst (also referred to as a “storage capacitor”). In an embodiment, the pixel circuit PXC may further include a third transistor T3 (also referred to as a “second switching transistor”), a fourth transistor T4 (also referred to as a “third switching transistor”), a fifth transistor T5 (also referred to as a “fourth switching transistor”), and a second capacitor Chold (also referred to as a “hold capacitor”).

The pixel PX may be driven by driving signals DRS and driving voltages. The driving signals DRS may include a first scan signal GW and a data signal (e.g., a data voltage Vdata). In an embodiment, the driving signals DRS may further include a second scan signal, a third scan signal GI, and/or an emission control signal EM. The driving voltages may include a first power voltage VDD and a second power voltage VSS. In an embodiment, the driving voltages may further include a reference power voltage VREF and/or an initialization power voltage VINT.

The first transistor T1 may be connected between the first power line PL1 and a second node N2. For example, a first electrode of the first transistor T1 may be connected to the first power line PL1 via the fifth transistor T5, and a second electrode of the first transistor T1 may be connected to the second node N2. The first power line PL1 may be a power line to which the first power voltage VDD is applied. The second node N2 may be a node between the first transistor T1 and the light emitting element LD. A gate electrode of the first transistor T1 may be connected to the first node N1.

The first transistor T1 may supply a driving current to the light emitting element LD. For example, the first transistor T1 may supply, to the light emitting element LD, a driving current corresponding to the first node N1.

The first transistor T1 may further include a bottom gate (not shown) so as to improve operational characteristics of the first transistor T1. For example, the bottom gate of the first transistor T1 may be connected between the second capacitor Chold and the second node N2.

The second transistor T2 may be connected between the data line DL and the first node N1. A gate electrode of the second transistor T2 may be connected to the first scan line SL1.

The second transistor T2 may be turned on in response to the first scan signal GW supplied to the first scan line SL1. When the second transistor T2 is turned on, a data signal supplied to the data line DL may be transferred to the first node N1.

The third transistor T3 may be connected between the reference power line RFL and the first node N1. The reference power line RFL may be a power line to which the reference power voltage VREF is applied. A gate electrode of the third transistor T3 may be connected to the second scan line SL2.

The third transistor T3 may be turned on in response to the second scan signal GB supplied to the second scan line SL2. When the third transistor T3 is turned on, the reference power voltage VREF may be connected to the first node N1.

The fourth transistor T4 may be connected between the second node N2 and the initialization power line INL. The initialization power line INL may be a power line to which the initialization power voltage VINT is applied. A gate electrode of the fourth transistor T4 may be connected to the third scan line SL3.

The fourth transistor T4 may be turned on in response to the third scan signal GI supplied to the third scan line SL3. When the fourth transistor T4 is turned on, the initialization power voltage VINT may be transferred to the second node N2.

The fifth transistor T5 may be connected between the first power line PL1 and the first transistor T1. A gate electrode of the fifth transistor T5 may be connected to the emission control line ECL.

The fifth transistor T5 may be turned off in response to the emission control signal EM supplied to the emission control line ECL. When the fifth transistor T5 is turned off, a current path through which a driving current can flow may be blocked in the pixel PX, and accordingly, the driving current may not be supplied to the light emitting element LD.

Although the first to fifth transistors T1, T2, T3, T4, and T5 may be implemented with an N-type transistor, the embodiments of the present disclosure are not limited thereto. For example, at least one of the first to fifth transistors T1, T2, T3, T4, and T5 may be implemented with a P-type transistor. A signal level (e.g., a voltage level) of the driving signals DRS for controlling driving of the transistor may be set according to the type of each transistor.

The first capacitor Cst may be connected between the first node N1 and the second node N2. A voltage corresponding to the data signal may be stored in the first capacitor Cst.

The second capacitor Chold may be connected between the first power line PL1 and the second node N2. The second capacitor Chold may stabilize a voltage of the second node N2.

The light emitting element LD may be connected between the second node N2 and the second power line PL2. For example, the light emitting element LD may be connected in a forward direction between the second node N2 and the second power line PL2. The second power line PL2 may be a power line to which the second power voltage VSS is applied. When a driving current is supplied from the first transistor T1, the light emitting element LD may emit light with a luminance corresponding to the driving current.

The light emitting element LD may include an organic light emitting diode. In another embodiment, the light emitting element LD may include at least one inorganic light emitting diode. The kind, size, and/or number of light emitting elements LD may be changed in some embodiments.

At least one transistor provided in the pixel PX may be an oxide semiconductor transistor. For example, at least one transistor including the first transistor T1 may be an oxide semiconductor transistor including an oxide semiconductor.

Figure 3:
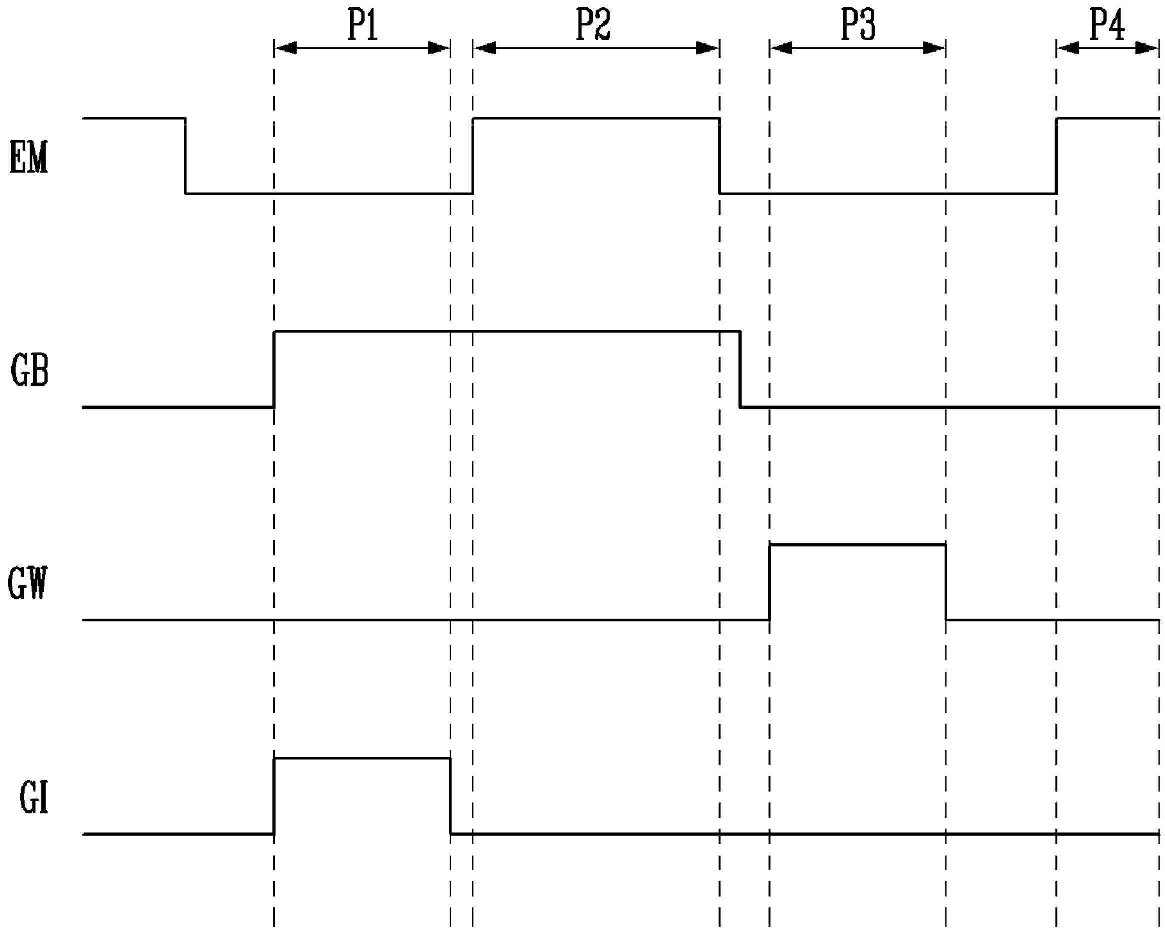
FIG. 3 is a waveform diagram illustrating driving signals supplied to the pixel shown in FIG. 2 in a display mode in accordance with embodiments.

FIG. 3 is a waveform diagram illustrating driving signals DRS supplied to the pixel shown in FIG. 2 in a display mode. For example, FIG. 3 illustrates an example of the first scan signal GM, the second scan signal GB, the third scan signal GI, and the emission control signal EM, which control an operation timing of the pixel PX. In an embodiment, pixels PX disposed on the same horizontal line shown in FIG. 1 may be simultaneously driven. Pixels PX disposed on different horizontal lines may be sequentially driven corresponding to respective horizontal periods.

Referring to FIGS. 2 and 3, a driving method of the pixel PXL in the display mode in accordance with an embodiment of the present disclosure may include an initialization phase, a threshold voltage compensation phase, a data writing phase, and a light emitting phase.

The initialization phase may be performed during a first period. In the initialization phase, the fourth transistor T4 may be turned on, thereby supplying the initialization power voltage VINT to the second node N2. To this end, the third scan signal GI having a gate-on voltage may be supplied to the third scan line SL3 during the first period P1.

Also, in the initialization phase, the third transistor T3 may also be turned on, thereby supplying the reference power voltage VREF to the first node N1. To this end, the second scan signal GB having the gate-on voltage may also be supplied to the second scan line SL2 during the first period P1.

Also, in the initialization phase, the fifth transistor T5 may be turned off, thereby blocking a driving current from being generated by the first transistor T1. To this end, the emission control signal EM having a gate-off voltage may be supplied to the emission control line ECL during the first period P1.

Through the above-described initialization operation, the pixel PX may be initialized not to be influenced by a data signal in a previous unit period (e.g., a previous frame period).

A voltage of the first node N1 and a voltage of the second node N2 may be expressed as shown in the following Equation 1.

$$VN1 = \mathrm{VREF}$$

$$VN2 = VINT \qquad \text{Equation 1}$$

(Here, VN1 is a voltage of the first node N1, VREF is a reference power voltage, VN2 is a voltage of the second node N2, and VINT is an initialization power voltage)

The threshold voltage compensation phase may be performed during a second period P2. In the threshold voltage compensation phase, the third transistor T3 and the fifth transistor T5 may be turned on, thereby storing a threshold voltage of the first transistor T1 in the first capacitor Cst. To accomplish this, during the second period P2, the second scan signal GB having the gate-on voltage may be supplied to the second scan line SL2, and the emission control signal EM having the gate-on voltage may be supplied to the emission control line ECL.

Accordingly, during the second period P2, the third transistor T3 may maintain an on-state, and the fifth transistor T5 may be turned on.

During the second period P2, the voltage of the first node N1 is maintained as the reference power voltage VREF, and the voltage of the second node N2 is changed from the initialization power voltage VINT to a value obtained by subtracting the threshold voltage of the first transistor T1 from the reference power voltage VREF.

A voltage of the first node N1 and a voltage of the second node N2 may be expressed as shown in the following Equation 2.

$$VN1=\text{VREF}$$

$$VN2=VREF-Vth1 \qquad \text{Equation 2}$$

(Here, VN1 is a voltage of the first node N1, VREF is a reference power voltage, VN2 is a voltage of the second node N2, and Vth1 is a threshold voltage of the first transistor T1)

Meanwhile, in order to maintain the light emitting element LD to be in a non-emission state during the threshold voltage compensation phase, the reference power voltage VREF may be set to have a voltage level at which the light emitting element LD can be maintained in the non-emission state.

A performance time of the threshold voltage compensation phase (e.g., a maintenance time of the second period P2) may be determined by the second scan signal GB and the emission control signal EM. For example, a width of the second scan signal GB and the emission control signal EM, which have the gate-on voltage, may be adjusted, so that the performance time of the threshold voltage compensation phase is adjusted.

The data writing phase may be performed during a third period P3. In the data writing phase, the second transistor T2 may be turned on, thereby supplying a data signal to the first node N1. For example, in the data writing phase, a data signal transferred from the data line DL may be supplied to the first node N1 via the second transistor T2.

To accomplish this, the first scan signal GW having the gate-on voltage may be supplied to the first scan line SL1 during the third period P3. Accordingly, during the third period P3, the second transistor T2 may maintain the on-state, and the third transistor T3, the fourth transistor T4, and the fifth transistor T5 may maintain an off-state.

During the third period P3, a voltage of the first node N1 may be maintained as a voltage of the data signal (e.g., the data voltage Vdata). During the third period P3, a voltage of the first node N1 and a voltage of the second node N2 may be expressed as shown in the following Equation 3.

$$VN1=\text{Vdata}$$

$$VN2=VREF-Vth1 \qquad \text{Equation 3}$$

(Here, VN1 is a voltage of the first node N1, Vdata is a data voltage, VREF is a reference power voltage, VN2 is a voltage of the second node N2, and Vth1 is a threshold voltage of the first transistor T1)

Additionally, for convenience of description, a case where the second node N2 maintains a voltage of VREF-Vth1 during the third period P3 has been described in Equation 3. However, the embodiments of the present disclosure are not limited thereto. During the third period P3, the voltage of the first node N1 may be changed from the reference power voltage VREF to the data voltage Vdata, and the voltage of the second node N2 may be changed corresponding to a voltage variation of the first node N1 due to coupling of the first capacitor Cst. However, in an embodiment of the present disclosure, a capacitance of the second capacitor Chold may be set greater than a capacitance of the first capacitor Cst, and accordingly, a voltage variation of the second node N2 can be minimized during the third period P3. Subsequently, for convenience of description, it is assumed that the second node N2 maintains the voltage of VREF-Vth1 during the third period P3.

Finally, the light emitting phase may be performed during a fourth period P4. In the light emitting phase, a driving current corresponding to the voltage stored in the first capacitor Cst may be supplied to the light emitting element LD by the first transistor T1.

To accomplish this, the scan signals GW, GB, and GI having the gate-on voltage may not be supplied to the first, second, and third scan lines SL1, SL2, and SL3 during the fourth period P4. For example, a voltage of the first, second, and third scan lines SL1, SL2, and SL3 may be the gate-off voltage during the fourth period P4. During the fourth period P4, the emission control signal EM having the gate-off voltage may not be supplied to the emission control line ECL. For example, the voltage of the emission control line ECL may be the gate-on voltage. Accordingly, the fifth transistor T5 may be turned on.

During the fourth period P4, a voltage of the first node N1 and a voltage of the second node N2 may be expressed as shown in the following Equation 4. Accordingly, the first transistor T1 may supply a driving current according to the following Equation 4 to the light emitting element LD.

$$\begin{aligned} VN1 &= Vdata + (Vld - VREF + Vth1) \qquad \text{Equation 4} \\ VN2 &= Vld \\ Ild &= k\left(\frac{Cst}{Cst + Chold + Cld}(Vgs - Vth1)\right)^2 \\ &= k\left(\frac{Cst}{Cst + Chold + Cld}(Vdata - VREF)\right)^2 \end{aligned}$$

(Here, VN1 is a voltage of the first node N1, Vdata is a data voltage, Vld is a voltage of the second node N2, VREF is a reference power voltage, VN2 is a voltage (e.g., an anode voltage) of the second node N2, Ild is a driving current generated by the first transistor T1, k is a constant, Vga is a voltage between a gate and a source of the first transistor T1, Cst is a capacitance of the first capacitor, Chold is a capacitance of the second capacitor, and Cld is a parasitic capacitance formed in the light emitting element)

As can be seen in Equation 4, the threshold voltage Vth1 of the first transistor T1 can be cancelled. Accordingly, a luminance non-uniformity phenomenon due to a threshold voltage variation of first driving transistors DT1, i.e., first transistors T1 included in the pixels PX can be prevented or reduced.

Figure 4:
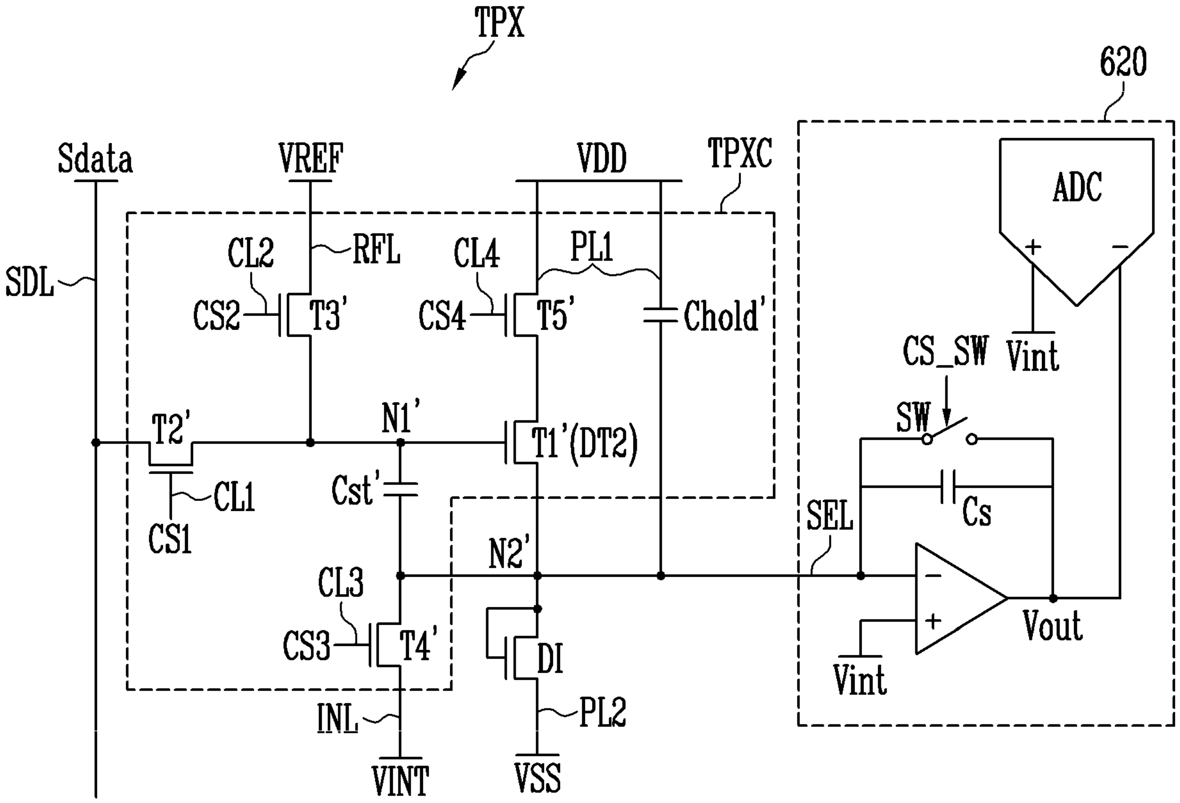
FIG. 4 is a circuit diagram illustrating a sensing pixel and a current sensing circuit in accordance embodiments.

FIG. 4 is a circuit diagram illustrating a sensing pixel TPX and a current sensing circuit 620 in accordance with embodiments.

The sensing pixel TPX shown in FIG. 4 may be the sensing pixel TPX provided in the display device 10 shown in FIG. 1. The display device 10 may include at least one sensing pixel TPX.

Referring to FIG. 4, the sensing pixel TPX may be connected to at least one control line CL and a sensing data line SDL. In an embodiment, the sensing pixel TPX may be connected to a first control line CL1, a second control line CL2, a third control line CL3, a fourth control line CL4, and the sensing data line SDL.

The sensing pixel TPX may be further connected to power lines. For example, the sensing pixel TPX may be connected to a first power line PL1 and a second power line PL2. In an embodiment, the sensing pixel TPX may be further connected to a reference power line RFL and an initialization power line INL.

The sensing pixel TPX may be driven by sensing signals SS and driving voltages. The sensing signals SS supplied to the sensing pixel TPX may be first sensing signals SS1 or second sensing signals SS2. The first sensing signals SS1 may include a first control signal CS1, a second control signal CS2, a third control signal CS3, a fourth control signal CS4, and sensing data Sdata, and the second sensing signals SS2 may include a control signal CS1, a third control signal CS3, a fourth control signal CS4, and a sensing data Sdata. The first sensing signals SS1 and the second sensing signals SS2 may be supplied to the sensing pixel TPX respectively in the first sensing mode and the second sensing mode.

The sensing signals SS may have waveforms substantially identical or similar to waveforms of the driving signals DRS. For example, the first control signal CS1, the third control signal CS3, and the fourth control signal CS4 of the first sensing signals SS1 and the second sensing signals SS2 may have waveforms substantially identical or similar to the waveforms of the first scan signal GW, the third scan signal GI, and the emission control signal EM, which are shown in FIG. 3. Similarly, the second control signal CS2 of the first sensing signals SS1 may have a waveform substantially identical or similar to the waveform of the second scan signal GB shown in FIG. 3.

The sensing signals SS may be supplied separately from the driving signals DRS. Accordingly, the sensing signals SS may independently driver the pixels PX and the sensing pixel TPX. For example, the first sensing signals SS1 or the second sensing signals SS2 may be supplied to the sensing pixel TPX in both a display period in which the pixels PX are driven and a sensing period in which a current I_TPX of the sensing pixel TPX is sensed. However, the sensing signals SS may be supplied to the sensing pixel TPX only when a sensing mode operates to prevent degradation of the sensing pixel TPX.

The driving voltages may include a first power voltage VDD and a second power voltage VSS. In an embodiment, the driving voltages may further include a reference power voltage VREF and/or an initialization power voltage VINT.

The sensing pixel TPX may include a sensing pixel circuit TPXC and a non-light emitting diode DI (e.g., a non-light emitting diode having a structure in which a transistor is diode-connected in the forward direction) connected to the sensing pixel circuit TPXC. Accordingly, unnecessary light emission of the sensing pixel TPX during a sensing period can be prevented.

A structure of the sensing pixel circuit TPXC may be substantially identical or similar to the structure of the pixel circuit PXC. For example, the sensing pixel circuit TPXC may include a first transistor T1' (also referred to as a “second driving transistor DT2”), a second transistor T2', a third transistor T3', a fourth transistor T4', a fifth transistor T5', a first capacitor Cst', and a second capacitor Chold', which correspond to the first transistor T1, the second transistor T2, the third transistor T3, the fourth transistor T4, the fifth transistor T5, the first capacitor Cst, and the second capacitor Chold of the pixel circuit PXC, respectively.

The first transistor T1' may be connected between the first power line PL1 and a second node N2'. For example, a first electrode of the first transistor T1' may be connected to the first power line PL1 via the fifth transistor T5', and a second electrode of the first transistor T1' may be connected to the second node N2'. The second node N2' may be a node disposed between the first transistor T1' and the non-light emitting diode DI. A gate electrode of the first transistor T1' may be connected to a first node N1'. The first transistor T1' may generate a driving current I_TPX corresponding to a voltage of the first node N1'.

The first transistor T1' may be a transistor having the same size, structure, and/or size as the first transistors T1 of the pixels PX, and be simultaneously formed with the first transistors T1 of the pixels PX. For example, the first transistor T1' may be formed substantially identically to the first transistors T1 of the pixels PX. In an example, the first transistor T1' may be an oxide semiconductor transistor substantially identical to the first transistors T1 of the pixels PX.

The second transistor T2' may be connected between the sensing data line SDL and the first node N1'. A gate electrode of the second transistor T2' may be connected to the first control line CL1.

The second transistor T2' may be turned on in response to the first control signal CS1 supplied to the first control line CL1. When the second transistor T2' is turned on, the sensing data voltage Sdata supplied to the sensing data line SDL may be transferred to the first node N1'.

The third transistor T3' may be connected between the reference power line RFL and the first node N1'. A gate electrode of the third transistor T3' may be connected to the second control line CL2.

The third transistor T3' may be turned on in response to the second control signal CS2 supplied to the second control line CL2. In an embodiment, the first sensing signal SS1 including the second control signal CS2 is supplied, the third transistor T3' may be turned on, so that the reference power voltage VREF is transferred to the first node N1'. In another embodiment, when the second sensing signal SS2 not including the second control signal CS2 is supplied, the third transistor T3' may maintain a turn-off state.

The fourth transistor T4' may be connected between the second node N2' and the initialization power line INL. A gate electrode of the fourth transistor T4' may be connected to the third control line CL3.

The fourth transistor T4' may be turned on in response to the third control signal CS3 supplied to the third control line CL3. When the fourth transistor T4' is turned on, the initialization power voltage VINT may be transferred to the second node N2'.

The fifth transistor T5' may be connected between the first power line PL1 and the first transistor T1'. A gate electrode of the fifth transistor T5' may be connected to the fourth control line CL4.

The fifth transistor T5' may be turned off in response to the fourth control signal CS4 having the gate-off voltage, which is supplied to the fourth control line CL4. When the fifth transistor T5' is turned off, a current path of the sensing pixel TPX may be blocked, so that the driving current I_TPX is not supplied to the non-light emitting diode DI.

The first to fifth transistors T1', T2', T3', T4', and T5' may be implemented with an N-type transistor, but the embodiments of the present disclosure are not limited thereto. For example, at least one of the first to fifth transistors T1', T2', T3', T4', and T5' may be implemented with a P-type transistor. In an embodiment, the first to fifth transistors T1', T2', T3', T4', and T5' of the sensing pixel TPX may be formed substantially identical to the first to fifth transistors T1, T2, T3, T4, and T5 of the pixel PX.

The first capacitor Cst' may be connected between the first node N1' and the second node N2. A voltage corresponding to the sensing data voltage Sdata may be stored in the first capacitor Cst'.

The second capacitor Chold' may be connected between the first power line PL1 and the second node N2'. The second capacitor Chold' may stabilize a voltage of the second node N2'.

The non-light emitting diode DI may be connected in the forward direction between the second node N2' and the second power line PL2. Accordingly, the sensing pixel TPX do not emit light, so that unnecessary light emission during the sensing period can be prevented.

The current sensing circuit 620 may include a sensing line SEL which is connected to the sensing pixel circuit TPXC and has a current I_TPX of the sensing pixel TPX flowing therein, an amplifier for sensing the current I_TPX, a switch SW connected to the amplifier to initialize the sensing line SEL, and an analog-to-digital converter (ADC) for generating sensing data SDT in a digital form, which corresponds to the current I_TPX.

The sensing line SEL may be connected to the sensing pixel circuit TPXC, and be connected to the ADC via the amplifier. In the first sensing mode, a current I_TPX generated in a driving transistor (e.g., a second driving transistor) of the sensing pixel TPX, corresponding to the sensing data voltage Sdata, may be finally transferred to the ADC through the sensing line SEL.

The amplifier may be connected to the sensing line SEL and may sense a current I_TPX flowing in the sensing line SEL by a predetermined repetition number of times. In an embodiment, the amplifier may operate as an integrator which senses a current flowing in the sensing line SEL by the predetermined repetition number of times for a predetermined time. The amplifier may include a non-inverting terminal to which the initialization power voltage VINT is applied, an inverting terminal connected to the sensing line SEL, and a third capacitor Cs connected between the inverting terminal and an output terminal Vout.

When sensing is started, i.e., when a sensing signal SS is applied to the sensing pixel TPX, the initialization power voltage VINT connected to the non-inverting terminal may be applied to initialize the sensing line SEL.

The inverting terminal may be connected to the sensing line SEL. When the sensing is started, a voltage such as the initialization power voltage VINT connected to the non-inverting terminal may be applied to initialize the sensing line SEL.

The third capacitor Cs may be connected to the inverting terminal and the output terminal Vout to sensing a current I_TPX transferred through the sensing line SEL for the predetermined time.

The switch SW may be connected in parallel to the third capacitor Cs of the amplifier. When the initialization power voltage VINT connected to the non-inverting terminal is applied, the switch SW may be turned on to initialize the sensing line SEL. When initialization is completed, the switch SW may be turned off such that sensing is possible. An operation of the switch SW may be controlled by a switch control signal CS_SW supplied from the timing controller 800.

The ADC may be connected to the amplifier, and generate sensing data SDT by performing analog-to-digital conversion on the current sensed in the amplifier. An inverting terminal of the ADC may be connected to the output terminal Vout of the amplifier, and the initialization power voltage VINT may be applied to a non-inverting terminal of the ADC. Like the amplifier, when sensing is started, i.e., when a first sensing signal SS1 is applied to the sensing pixel TPX, the initialization power voltage VINT may be applied to the non-inverting terminal of the ADC for the purpose of initialization.

Figure 5:
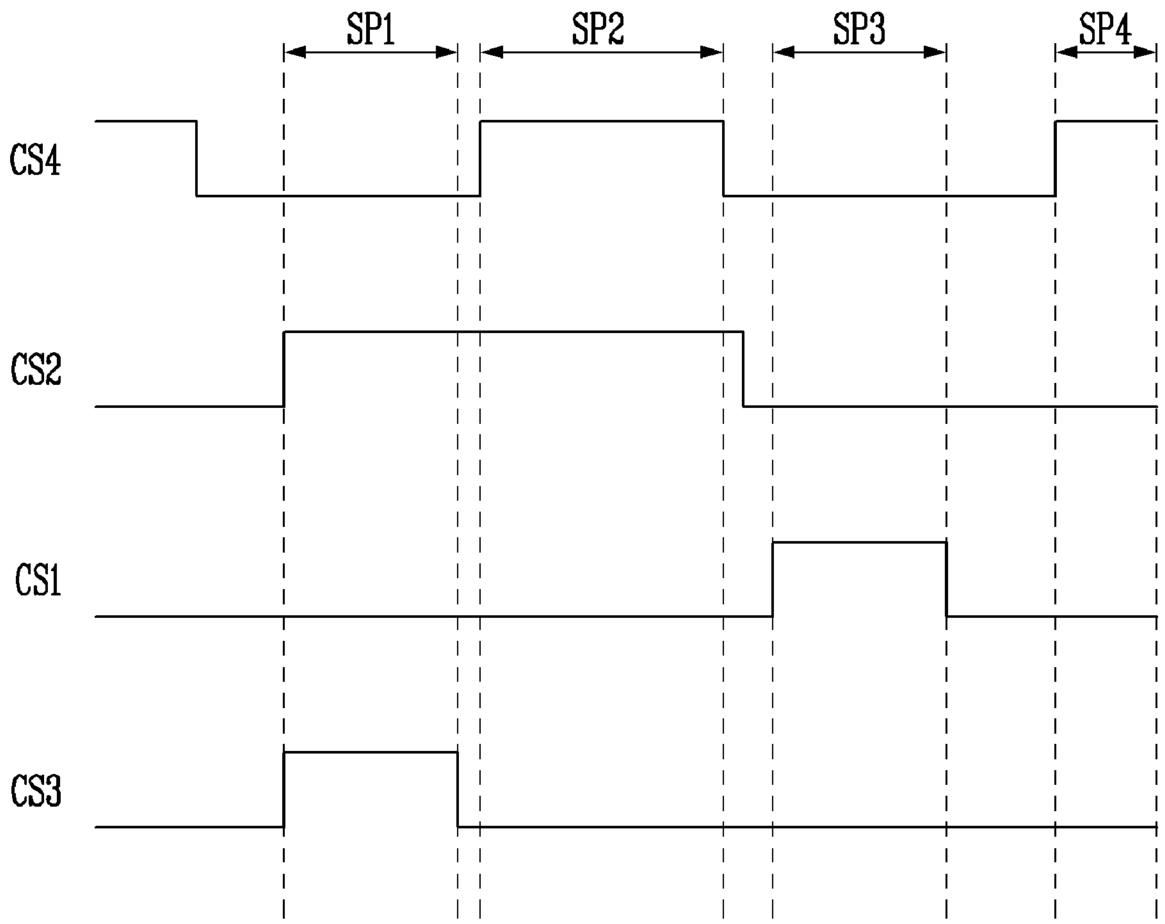
FIG. 5 is a waveform diagram illustrating first sensing signals applied to the sensing pixel shown in FIG. 4 in a first sensing mode in accordance embodiments.

FIG. 5 is a waveform diagram illustrating first sensing signals applied to the sensing pixel shown in FIG. 4 in the first sensing mode in accordance with embodiments.

Referring to FIGS. 3, 4, and 5, in the first sensing mode, the first sensing signals SS1, i.e., the first control signal CS1, the second control signal CS2, the third control signal CS3, and the fourth control signal CS4 may be applied to the sensing pixel TPX. As described above, the first control signal CS1, the second control signal CS2, the third control signal CS3, and the fourth control signal CS4 may respectively correspond to the first scan signal GW, the second scan signal GB, the third scan signal GI, and the emission control signal EM, which are applied to the pixel PX, and therefore, the sensing pixel TPX may operate identically to the operation timing (FIG. 3) of the pixel PX in the first sensing mode. Accordingly, the sensing pixel TPX may generate a current I_TPX through an initialization phase SP1, a threshold voltage compensation phase SP2, a data writing phase SP3, and a light emitting phase SP4, and the generated current I_TPX may be sensed through the sensing unit 600. However, unlike the pixel PX, the sensing pixel TPX includes the non-light emitting diode DI instead of the light emitting element LD, and hence light emission is not actually made. The first sensing mode goes through the threshold voltage compensation phase, and hence the temperature sensitivity of the driving transistor is lowered. Thus, it is advantageous in temperature sensing when a temperature change is large.

Figure 6:
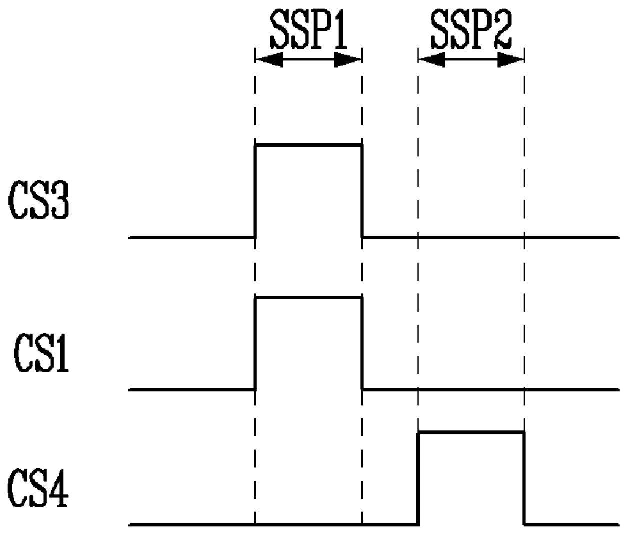
FIG. 6 is a waveform diagram illustrating second sensing signals applied to the sensing pixel shown in FIG. 4 in a second sensing mode in accordance with embodiments.

FIG. 6 is a waveform diagram illustrating second sensing signals applied to the sensing pixel shown in FIG. 4 in the second sensing mode in accordance with embodiments.

Referring to FIGS. 3, 4, and 6, in the second sensing mode, the second sensing signals SS2, i.e., the first control signal CS1, the third control signal CS3, and the fourth control signal CS4 may be applied to the sensing pixel TPX. As described above, unlike the first sensing mode, the second control signal CS2 is not applied in the second sensing mode. Accordingly, in the second sensing mode, the sensing pixel TPX may generate a current I_TPX through an initialization and data writing phase SSP1 (the same as a first period) and a light emitting phase SSP2 (the same as a second period), and the generated current I_TPX may be sensed through the sensing unit 600.

The initialization and data writing phase may be performed during a first period SSP1. In the initialization and data writing phase, the fourth transistor T4' may be turned on, thereby supplying the initialization power voltage VINT to the second node N2'. To this end, the third control signal CS3 having the gate-on voltage may be supplied to the third control line CL3 during the first period SSP1. The initialization power voltage VINT may be set as a sufficiently low voltage such that a current I_TPX generated in the first transistor T1' does not flow through the non-light emitting diode D1.

Also, in the initialization and data writing phase, the second transistor T2' may be turned on, thereby supplying the sensing data voltage Sdata to the first node N1'. For example, in the initialization and data writing phase, the sensing data voltage Sdata transferred from the sensing data line SDL may be supplied to the first node N1' via the second transistor T2'.

To accomplish this, the first control signal CS1 having the gate-on voltage may be supplied to the first control line CL1 during the first period SSP1. Accordingly, the second transistor T2' may maintain the on-state during the first period SSP1.

Also, in the initialization and data writing phase, the fifth transistor T5' may be turned off, thereby blocking the driving current I_TPX from being generated by the first transistor T1'. To accomplish this, the fourth control signal having the gate-off voltage may be supplied to the fourth control line CL4 during the first period SSP1.

Through the above-described initialization and data writing phase, the sensing pixel TPX may be initialized not to be influenced by the sensing data voltage Sdata supplied in a previous unit period (e.g., a previous frame period), and write the sensing data voltage Sdata.

The light emitting phase may be performed during a second period SSP2. In the light emitting phase, a current I_TPX corresponding to the voltage stored in the first capacitor Cst' may be generated by the first transistor T1'. However, as the initialization power voltage VINT is set as a voltage at which the non-light emitting diode DI does not operate, the generated current I_TPX does not flow through the non-light emitting diode DI but flows into the sensing unit 600.

To accomplish this, the control signals CS1 and CS3 having the gate-on voltage may not be supplied to the first and third control lines CL1 and CL3 during the second period SSP2. For example, a voltage of the first and third control lines CL1 and CL3 may be the gate-off voltage during the second period SSP2. During the second period SSP2, the fourth control signal CS4 having the gate-off voltage may not be supplied to the fourth control line CL4. For example, a voltage of the fourth control line CL4 may be the gate-on voltage during the second period SSP2. Accordingly, the fifth transistor T5' may be turned on. However, unlike the pixel PX, the sensing pixel TPX includes the non-light emitting diode DI instead of the light emitting element LD, and hence light emission is not actually made.

Meanwhile, magnitudes of the first power voltage VDD and the initialization power voltage VINT, which are supplied to the sensing pixel TPX may vary such that a current is generated in the second sensing mode.

The second sensing mode does not go through the threshold voltage compensation phase, and hence the temperature sensitivity of the driving transistor becomes high. Thus, it is advantageous in temperature sensing when a temperature change is small.

Figure 8:
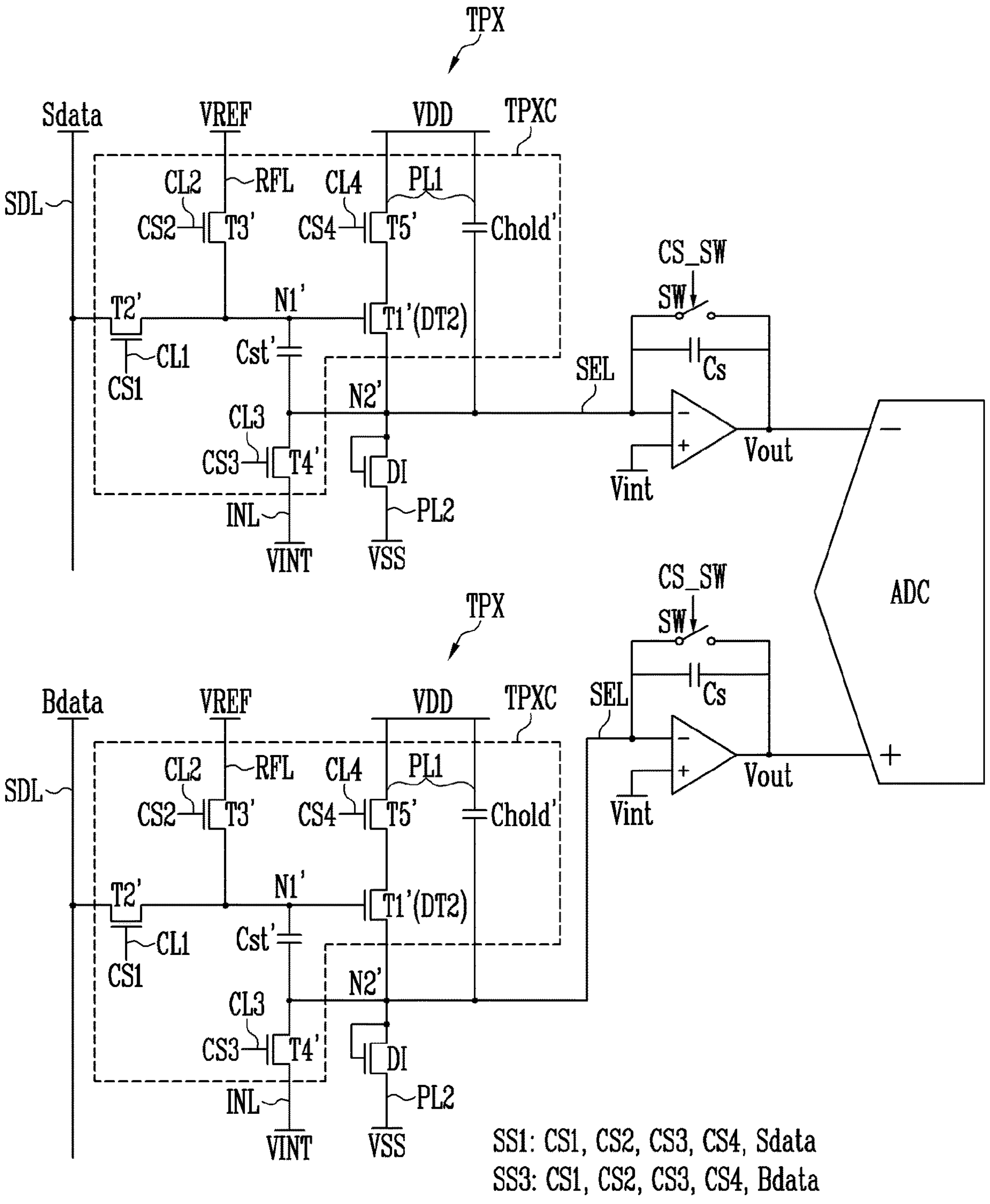
FIG. 8 is a circuit diagram of sensing pixels in a third sensing mode in accordance with embodiments.

FIG. 8 is a circuit diagram of sensing pixels in the third sensing mode in accordance with embodiments. The circuit diagram of each sensing pixel TPX shown in FIG. 8 may be substantially identical or similar to the circuit diagram of the sensing pixel TPX shown in FIG. 4.

Referring to FIG. 8, in the third sensing mode, a first sensing signal SS1 may be applied to one sensing pixel TPX selected from at least two sensing pixels TPX, and a third sensing signal SS3 may be applied another sensing pixel TPX. That is, a first control signal CS1, a second control signal CS2, a third control signal CS3, a fourth control signal CS4, and a sensing data voltage Sdata may be applied one sensing pixel TPX among sensing pixels TPX, and the first control signal CS1, the second control signal CS2, the third control signal CS3, the fourth control signal CS4, and a black data voltage Bdata may be applied to another sensing pixel TPX. Accordingly, each sensing pixel TPX may generate a current I_TPX by operating according to the waveform diagram shown in FIG. 5, and generate sensing data SDT by sensing the current I_TPX in the sensing unit 600.

The third sensing mode is used to effectively remove noise of the sensing data SDT. Any one of currents generated in the current sensing circuit 620 connected to each sensing pixel TPX may be input to the inverting terminal of the ADC, and another of the currents generated in the current sensing circuit 620 may be input to the non-inverting terminal of the ADC. The ADC may generate sensing data SDT by performing analog-to-digital conversion, using two currents.

Figure 9:
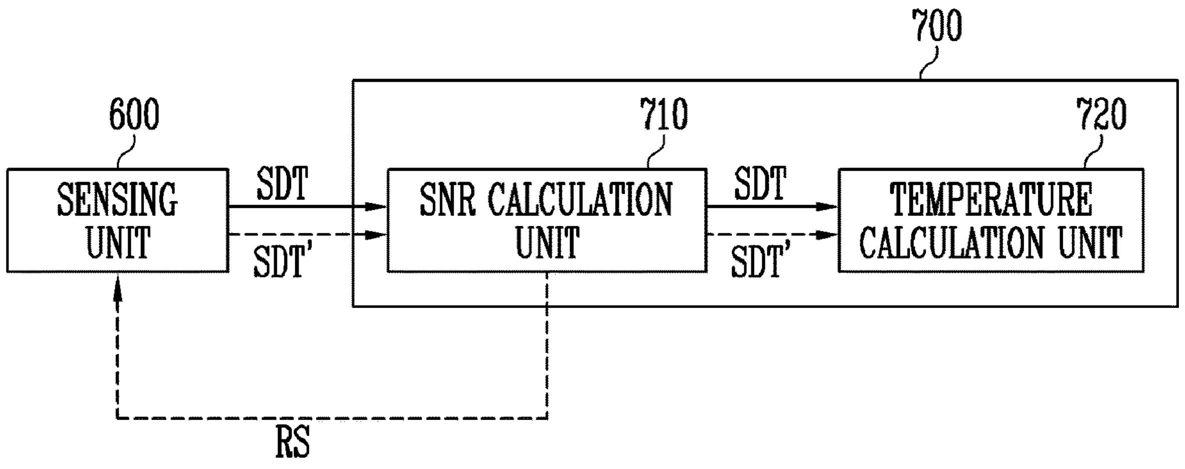
FIG. 9 is a block diagram illustrating a temperature output unit in accordance with embodiments.

FIG. 9 is a block diagram illustrating a temperature output unit in accordance with embodiments.

Referring to FIG. 9, the temperature output unit 700 may include a Signal to Noise Ratio (SNR) calculation unit 710 for calculating an SNR of sensing data SDT and a temperature calculation unit 720 for calculating a temperature by comparing the sensing data SDT with pre-secured temperature-current data of a driving transistor.

The SNR calculation unit 710 may calculate an SNR of sensing data SDT generated in the sensing unit 600, and accordingly, the quality of the sensing data SDT can be checked. The SNR is defined as Pa/Pn, the Pa and the Pn respectively represent power of a signal and power of noise, and a decibel (db) is used as a unit.

The SNR calculation unit 710 may calculate a Signal to Noise Ratio (SNR) of sensing data SDT, and transfer the sensing data SDT to the temperature calculation unit 720 or reset a predetermined repetition number of times in the sensing unit 600 according to a result obtained by comparing the SNR with a predetermined value. For example, when the calculated SNR of the sensing data SDT is less than the predetermined value, the SNR calculation unit 710 may supply, to the sensing unit 600, a reset signal RS for changing the predetermined repetition number of times in the sensing unit 600. Corresponding to the reset signal RS, the sensing unit 600 may change the predetermined repetition number of times, initialize the sensing line SEL, and sense a current by the changed repetition number of times to generate sensing data SDT' in which a specific SNR is secured. The predetermined repetition number of times in the sensing unit 600 may increase according to the reset signal RS. However, the present disclosure is not limited thereto, and the predetermined repetition number of times may decrease.

Subsequently, when the calculated SNR of the sensing data SDT' according to the reset repetition number of times is equal to or greater than the predetermined value, the SNR calculation unit 710 may transfer the sensing data SDT' to the temperature calculation unit 720. That is, when the initially calculated SNR of the sensing data SDT is equal to or greater than the predetermined value, the SNR calculation unit 710 may immediately transfer the sensing data SDT to the temperature calculation unit 720. As described above, the SNR calculation unit 710 allows the SNR of the sensing data SDT to be equal to or greater than the predetermined value, so that the quality of the sensing data SDT can be further improved.

The temperature calculation unit 720 may calculate a temperature of the display panel 100 by comparing the sensing data SDT or SDT' transferred from the SNR calculation unit 710 with data of a pre-secured temperature-current relationship of the driving transistor included in the sensing pixel TPX. For example, the temperature calculation unit 720 may compare a current value included in the sensing data SDT or SDT' with a current value of the data of the pre-secured temperature-current relationship of the driving transistor included in the sensing pixel TPX, thereby calculating a temperature corresponding to the current value as an internal temperature of the display panel 100. To accomplish this, the data of the pre-secured temperature-current relationship of the driving transistor included in the sensing pixel TPX may be stored in a form such as a look-up table in the temperature calculation unit 720. As described above, the temperature calculation unit 720 calculates a temperature based on the sensing data SDT or SDT' derived from the driving transistor which is included in the sensing pixel TPX and in which a current generated according to temperature varies. Thus, temperature can be more accurately measured as compared with an external temperature sensor.

The temperature calculation unit 720 may transfer the calculated temperature to the timing controller 800 such that afterimage compensation is performed. The timing controller 800 changes data voltages applied to the pixels PX based on the transferred temperature, so that afterimage compensation performance can be improved.

Figure 10:
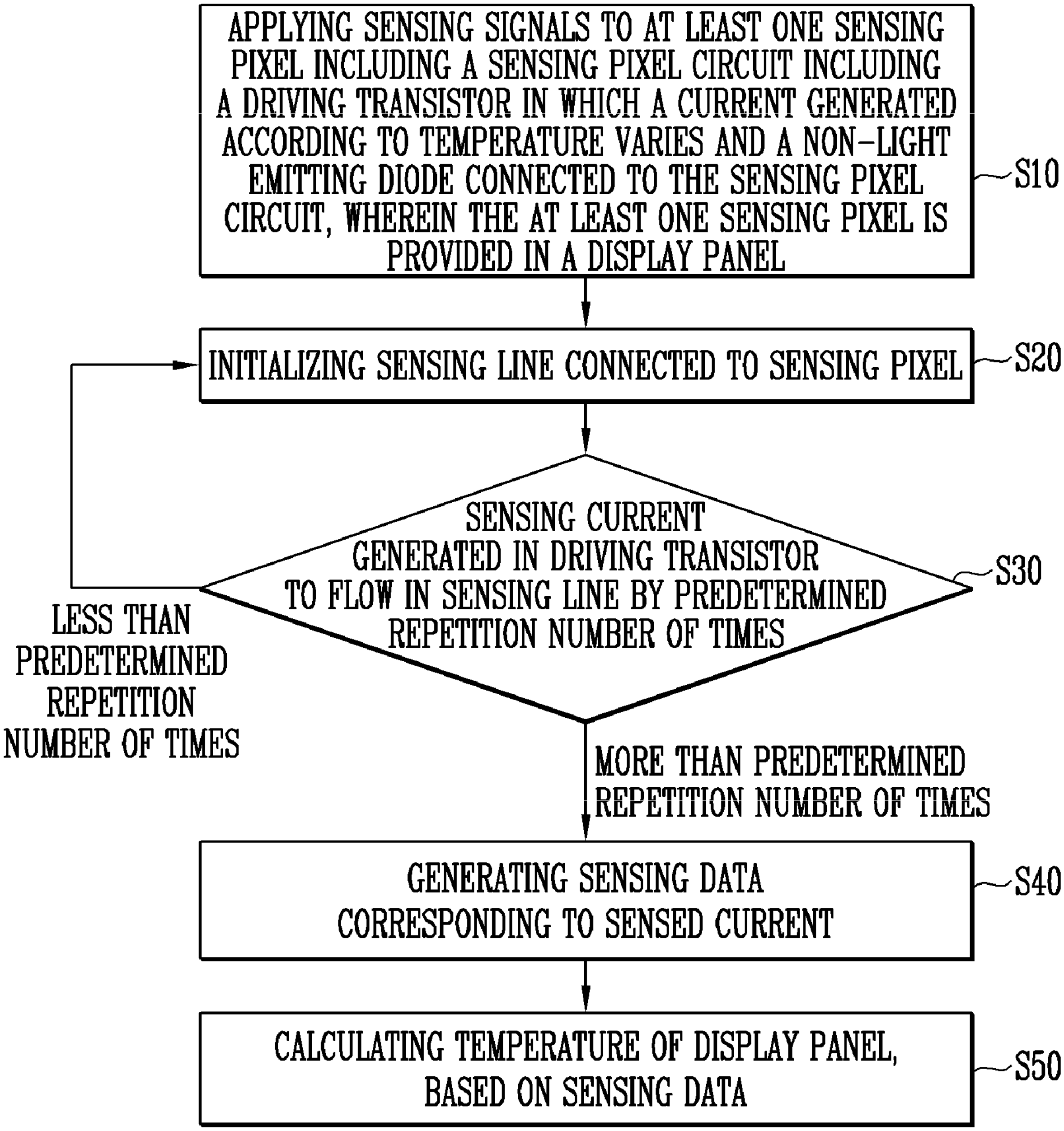
FIG. 10 is a block diagram illustrating a temperature sensing method of the display device in accordance with embodiments.

FIG. 10 is a block diagram illustrating a temperature sensing method of the display device in accordance with embodiments.

Referring to FIG. 10, the temperature sensing method of the display device in accordance with the embodiment of the present disclosure may include 1) applying sensing signals to at least one sensing pixel including a sensing pixel circuit including a driving transistor in which a current generated according to temperature varies and a non-light emitting diode connected to the sensing pixel circuit, the at least one sensing pixel being provided in a display panel (step S10), 2) initializing a sensing line connected to the sensing pixel (step S20), 3) sensing a current generated in the driving transistor to flow in the sensing line by a predetermined repetition number of times (step S30), 4) generating sensing data corresponding to the sensed current (step S40), and 5) calculating a temperature of the display panel based on the sensing data (step S50).

The step S10 may comprise a step of starting sensing by applying sensing signals SS to at least one sensing pixel including a sensing pixel circuit including a driving transistor in which a current generated according to temperature varies and a non-light emitting diode connected to the sensing pixel circuit, wherein the at least one sensing pixel is provided in a display panel. The sensing signals SS may be first sensing signals SS1 or the second sensing signals SS2, wherein sensing singles SS1 includes a sensing data voltage Sdata, a first control signal CS1, a second control signal CS2, a third control signal CS3, and a fourth control signal CS4, and wherein second sensing signals SS2 includes a sensing data voltage Sdata, a first control signal CS1, a third control signal CS3, and a fourth control signal CS4. That is, when the first sensing signals SS1 are applied, the display device may operate according to the above-described first sensing mode. When the second sensing signals SS2 are applied, the display device may operate according to the above-described second sensing mode.

In addition, when two or more sensing pixels TPX are provided in the display panel, the first sensing signals SS1 may be applied to one sensing pixel TPX selected from the plurality of sensing pixels TPX, and third sensing signals SS3 may be applied to another sensing pixel TPX. The third sensing signals SS3 may include a black data voltage, the first control signal, the second control signal, the third control signal, and the fourth control signal. Accordingly, the display device may operate according to the above-described third sensing mode (or differential sensing mode).

A structure of the sensing pixel is the same as described above, and therefore, overlapping descriptions will be omitted.

The step S20 may comprise a step of initializing a sensing line SEL connected to the sensing pixel TPX, thereby removing influence caused by previous sensing.

The step S30 may comprise a step of sensing a current generated in the driving transistor to flow in the sensing by a predetermined repetition number of times, and a high quality of sensing data SDT can be secured through repetitive sensing. In the step S30, when an accumulated sensing number of times is less than the predetermined repetition number of times, the display device returns to the step S20, thereby initializing the sensing line SEL and then repeating sensing. Subsequently, when the accumulated sensing number of times is equal to or greater than the predetermined repetition number of times, the display device ends the sensing and proceeds to the step S40.

The step S40 may comprise a step of generating sensing data SDT corresponding to the sensed current, and the sensing data SDT is generated by performing analog-to-digital conversion on the sensed current.

After the step S40, step S41 (not shown in FIG. 10) of filtering the generated sensing data SDT may be further included. Accordingly, noise of the sensing data SDT can be effectively removed.

The step S50 may comprise a step of calculating a temperature of the display panel, based on the sensing data SDT. The step S50 may be performed when an SNR of the sensing data SDT is equal to or greater than a predetermined value. On the contrary, when the SNR of the sensing data SDT is less than the predetermined value, the display device rests the predetermined repetition number of times in the step S30, returns to the step S20 to initialize the sensing line SEL, and then repeats sensing by the reset repetition number of times. Accordingly, a high SNR of the sensing data SDT is secured, and the temperature of the display panel can be more accurately sensed based on the SNR of the sensing data SDT.

When the SNR of the sensing data SDT is equal to or greater than the predetermined value in the step S50, a temperature corresponding to the sensing data SDT is calculated from data of a pre-secured temperature-current relationship. A method of calculating a temperature by using the sensing data SDT and the data of the pre-secured temperature-current relationship is the same as described above, and therefore, detailed descriptions will be omitted.

In embodiments, sensing data is generated by sensing a current transferred from a sensing pixel including a driving transistor in which a current generated according to temperature varies, instead of an external temperature sensor, and a temperature is measured from the sensing data. Thus, a temperature in the display device can be more accurately measured.

In addition, noise of the sensing data can be effectively removed through repetitive sensing, filter application, a differential mode, and the like.

Example embodiments have been disclosed. Although specific terms are employed, they are used and are to be interpreted in a generic and descriptive sense and not for purpose of limitation. Features, characteristics, and/or elements described in connection with a particular embodiment may be used singly or in combination with features, characteristics, and/or elements described in connection with other embodiments unless otherwise specifically indicated. Various changes in form and details may be made to the disclosed example embodiments without departing from the scope set forth in the following claims.

What is claimed is:

1. A display device comprising:

at least one sensing pixel including a sensing pixel circuit having a driving transistor in which a current generated according to temperature varies and a non-light emitting diode connected to the sensing pixel circuit, the at least one sensing pixel being provided in a display panel;

a sensing unit including a current sensing circuit having a sensing line which is connected to the sensing pixel circuit and has a current of the sensing pixel flowing therein, the sensing unit sensing a current generated in the driving transistor to flow in the sensing line by a predetermined repetition number of times, the sensing unit generating sensing data corresponding to the sensed current; and a temperature output unit to calculate a temperature of the display panel based on the sensing data, wherein, in a first sensing mode, a first sensing signal is applied to the sensing pixel, and wherein the first sensing signal includes a sensing data voltage, a first control signal, a second control signal, a third control signal, and a fourth control signal.

2. The display device of claim 1, wherein the sensing data voltage is a voltage corresponding to data of a pre-secured temperature-current relationship of the driving transistor.

3. The display device of claim 2, wherein the temperature output unit includes:

a Signal to Noise Ratio (SNR) calculation unit configured to calculate an SNR of the sensing data and compare the calculated SNR with a predetermined value; and a temperature calculation unit configured to calculate a temperature corresponding to the sensing data from the data of the pre-secured temperature-current relationship, when the calculated SNR is equal to or greater than the predetermined value.

4. The display device of claim 3, wherein, when the calculated SNR is less than the predetermined value, the SNR calculation unit resets the predetermined repetition number of times, and wherein the sensing unit again performs sensing by the reset repetition number of times.

5. The display device of claim 1, wherein the sensing pixel circuit further includes:

a first switching transistor connected between a first node connected to a gate electrode of the driving transistor and a data line to which a data voltage is applied, the first switching transistor being turned on in response to the first control signal;

a second switching transistor connected between a reference power line to which a reference power voltage is applied and the first node, the second switching transistor being turned on in response to the second control signal;

a first capacitor connected between the first node and a second node which is disposed between the driving transistor and the non-light emitting diode;

a third switching transistor connected between an initialization power line to which an initialization power voltage is applied and the second node, the third switching transistor being turned on in response to the third control signal;

a fourth switching transistor connected between a first power line to which a first power voltage is applied and the driving transistor, the fourth switching transistor being turned off in response to the fourth control signal; and a second capacitor connected between the first power line and the second node.

6. The display device of claim 1, wherein the current sensing circuit further includes:

an amplifier to sense the current;

a switch connected to the amplifier to initialize the sensing line; and an Analog-to-Digital Converter (ADC) to generate sensing data in a digital form, which corresponds to the current.

7. The display device of claim 1, wherein the sensing unit initializes the sensing line before sensing, and repetitively performs sensing by initializing the sensing line, when the sensing is performed less than the predetermined repetition number of times.

8. The display device of claim 1, further comprising a filter unit configured to filter the generated sensing data.

9. The display device of claim 1, wherein, in a second sensing mode, a second sensing signal is applied to the sensing pixel, and wherein the second sensing signal includes a sensing data voltage, a first control signal, a third control signal, and a fourth control signal.

10. The display device of claim 1, wherein at least two sensing pixels are provided in the display panel, wherein, in a third sensing mode, a first sensing signal is applied to one sensing pixel selected from the sensing pixels, and a third sensing signal is applied to another sensing pixel, and wherein the third sensing signal includes a black data voltage, a first control signal, a second control signal, a third control signal, and a fourth control signal.

11. A temperature sensing method of a display device, the temperature sensing method comprising steps of:

applying sensing signals to at least one sensing pixel including a sensing pixel circuit having a driving transistor in which a current generated according to temperature varies and a non-light emitting diode connected to the sensing pixel circuit, the at least one sensing pixel being provided in a display panel;

initializing a sensing line connected to the sensing pixel;

sensing a current generated in the driving transistor to flow in the sensing line by a predetermined repetition number of times;

generating sensing data corresponding to the sensed current; and calculating a temperature of the display panel based on the sensing data.

12. The temperature sensing method of claim 11, wherein the sensing signals include first sensing signals or second sensing signals, wherein the first sensing signals include a sensing data voltage, a first control signal, a second control signal, a third control signal, and a fourth control signal, and wherein the second sensing signals include a sensing data voltage, a first control signal, a third control signal, and a fourth control signal.

13. The temperature sensing method of claim 12, wherein the sensing data voltage is a voltage corresponding to data of a pre-secured temperature-current relationship of the driving transistor.

14. The temperature sensing method of claim 13, wherein, in the calculating of the temperature, a temperature corresponding to the sensing data is calculated from the data of the pre-secured temperature-current relationship.

15. The temperature sensing method of claim 11, wherein the sensing pixel further includes:

a first switching transistor connected between a first node connected to a gate electrode of the driving transistor and a data line to which a data voltage is applied, the first switching transistor being turned on in response to the first control signal;

a second switching transistor connected between a reference power line to which a reference power voltage is applied and the first node, the second switching transistor being turned on in response to the second control signal;

a first capacitor connected between the first node and a second node between the driving transistor and the non-light emitting diode;

a third switching transistor connected between an initialization power line to which an initialization power voltage is applied and the second node, the third switching transistor being turned on in response to the third control signal;

a fourth switching transistor connected between a first power line to which a first power voltage is applied and the driving transistor, the fourth switching transistor being turned off in response to the fourth control signal; and a second capacitor connected between the first power line and the second node.

16. The temperature sensing method of claim 11, wherein, when the sensing is performed less than the predetermined repetition number of times, the sensing line is initialized, thereby repetitively performs performing sensing.

17. The temperature sensing method of claim 11, further comprising a step of filtering the generated sensing data, after the generating sensing data corresponding to the sensed current.

18. The temperature sensing method of claim 11, wherein the calculating of the temperature is performed when an SNR of the sensing data is equal to or greater than a predetermined value.

19. The temperature sensing method of claim 18, wherein, when the SNR of the sensing data is less than the predetermined value, the predetermined repetition number of times is reset, and the temperature sensing method is restarted from the initializing.

20. The temperature sensing method of claim 11, wherein at least two sensing pixels are provided in the display panel, wherein first sensing signals are applied to one sensing pixel selected from the sensing pixels, and third sensing signals are applied to another sensing pixel, wherein the first sensing signals include a sensing data voltage, a first control signal, a second control signal, a third control signal, and a fourth control signal, and wherein the third sensing signals include a black data voltage, a first control signal, a second control signal, a third control signal, and a fourth control signal.

* * * * *